United States Patent
Song et al.

(10) Patent No.: US 9,002,266 B2
(45) Date of Patent: Apr. 7, 2015

(54) MOBILE TERMINAL AND CONTROL METHOD THEREOF

(75) Inventors: Yoomee Song, Seoul (KR); Yeerang Yun, Seoul (KR); Minjeong Lee, Seoul (KR); Choongae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 137 days.

(21) Appl. No.: 13/590,850

(22) Filed: Aug. 21, 2012

(65) Prior Publication Data
US 2013/0072116 A1    Mar. 21, 2013

(30) Foreign Application Priority Data
Sep. 21, 2011  (KR) .................. 10-2011-0095154

(51) Int. Cl.
H04B 5/00     (2006.01)
H04B 7/26     (2006.01)

(52) U.S. Cl.
CPC ........................ *H04B 7/26* (2013.01)

(58) Field of Classification Search
CPC ..................... G06Q 20/3278; G06Q 20/327
USPC .................................. 455/41.1, 41.2
See application file for complete search history.

(56) References Cited

U.S. PATENT DOCUMENTS 8,644,842 B2 *  2/2014  Arrasvuori et al. ........ 455/456.1

* cited by examiner

*Primary Examiner* — Eugene Yun
(74) *Attorney, Agent, or Firm* — KED & Associates LLP

(57) ABSTRACT

A mobile terminal includes: a display; a short-range communication module; and a controller configured to establish a communication link with at least one first terminal located within a predetermined distance by using the short-range communication module, obtain second information associated with first information when the first information is obtained through the established communication link, and display the same on the display. Based on information obtained through a short-range communication link, information associated with the obtained information is obtained, thereby providing various services by using short-range communication.

17 Claims, 27 Drawing Sheets

FIG. 8
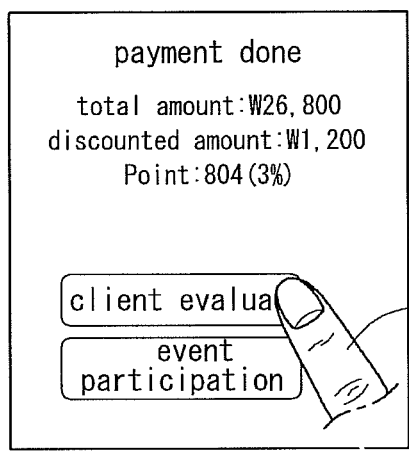
(a)
(b)
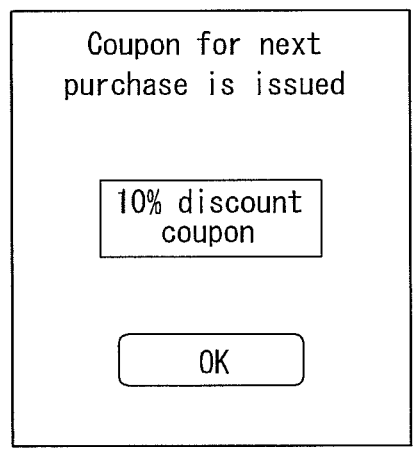
(c)

FIG. 9

FIG. 10
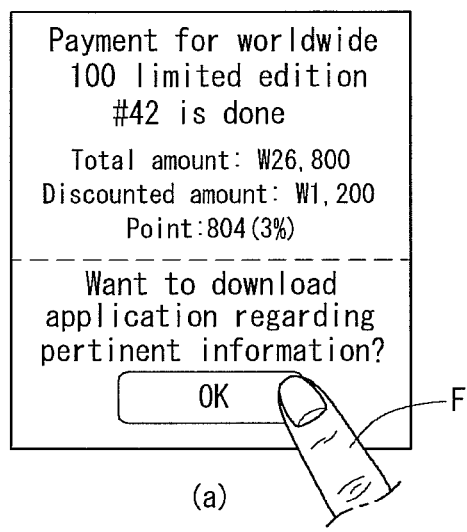
(a)
(b)

FIG. 11
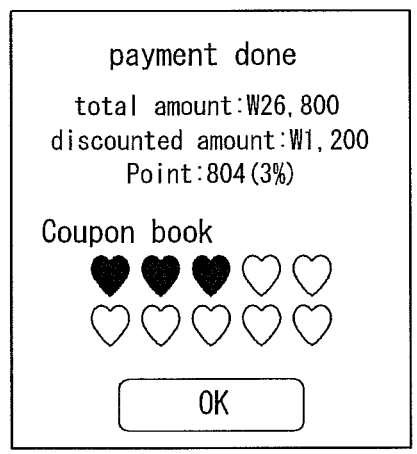
(a)
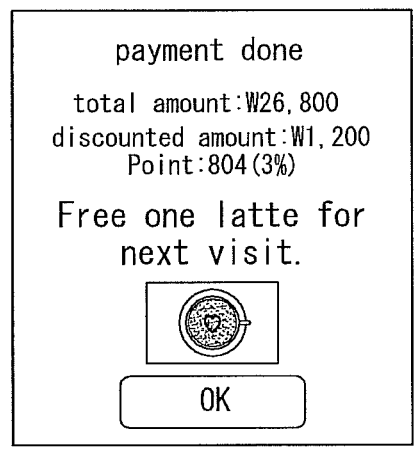
(b)

FIG. 13
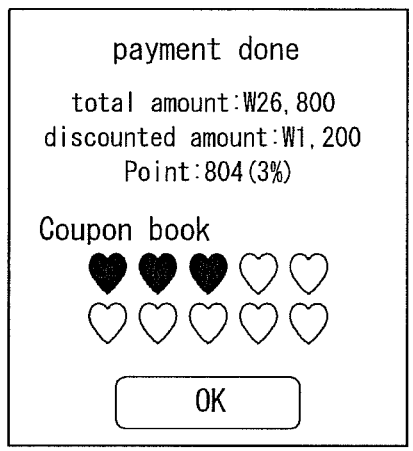
(a)
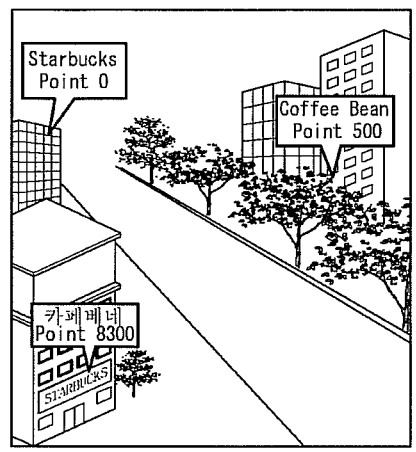
(b)
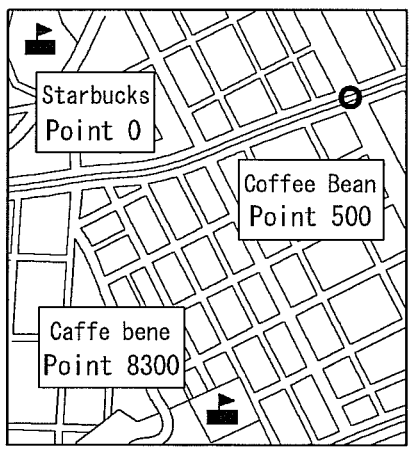
(c)
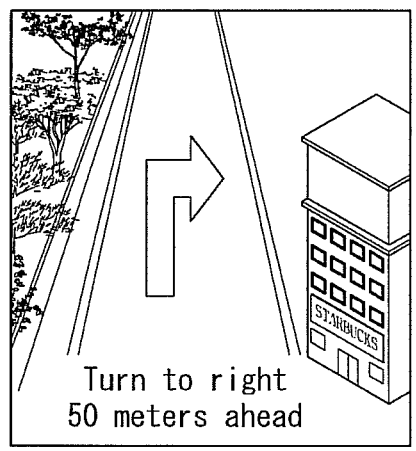
(d)

FIG. 14
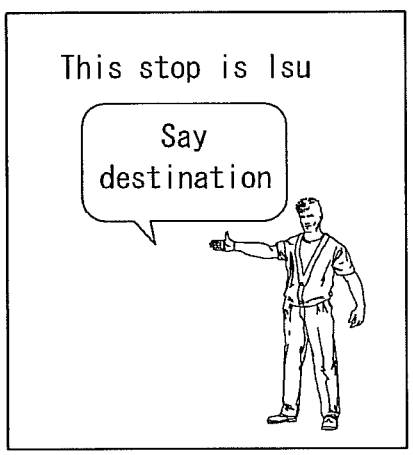
(a)
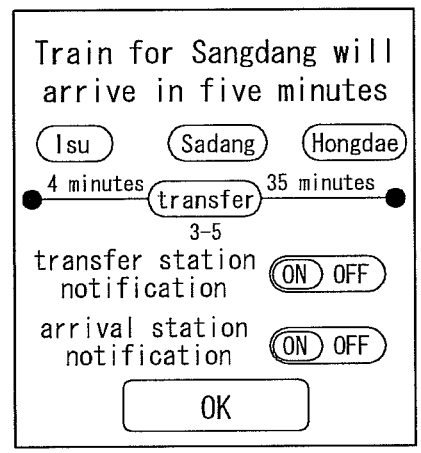
(b)
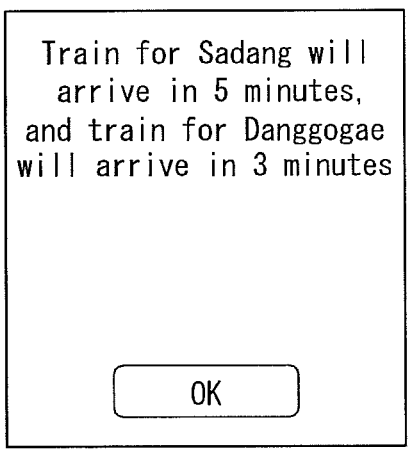
(c)
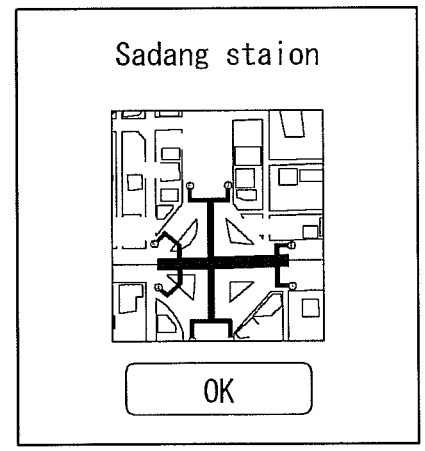
(d)

FIG. 15
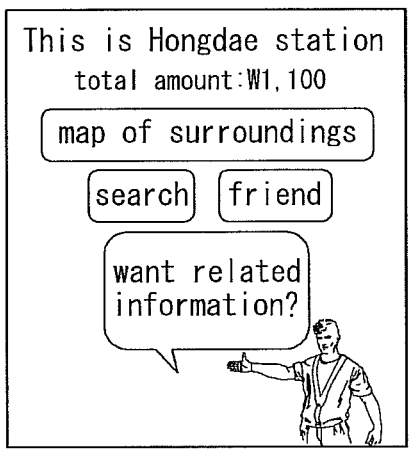
(a)
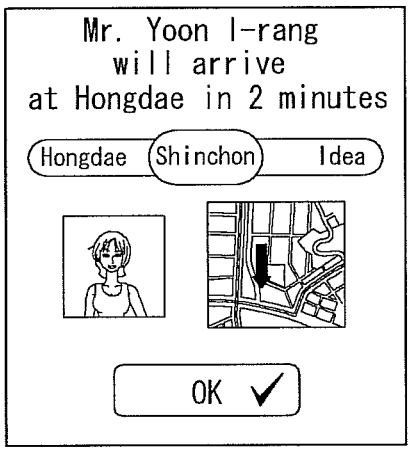
(b)
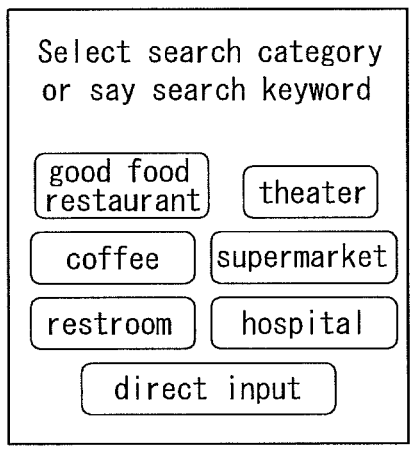
(c)
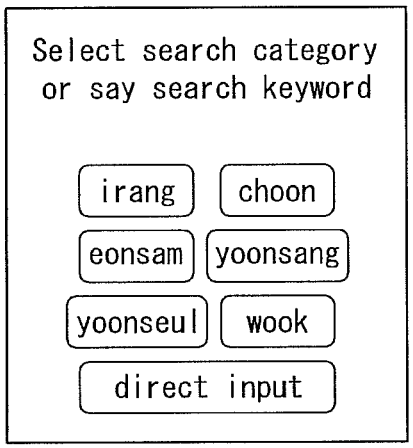
(d)

FIG. 16
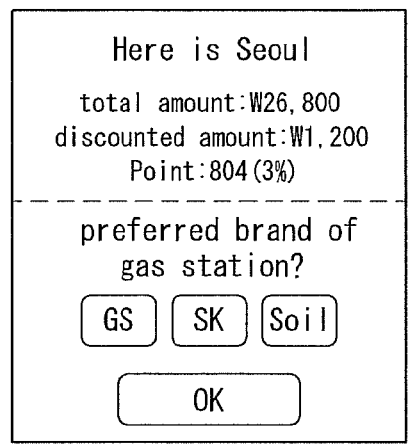
(a)
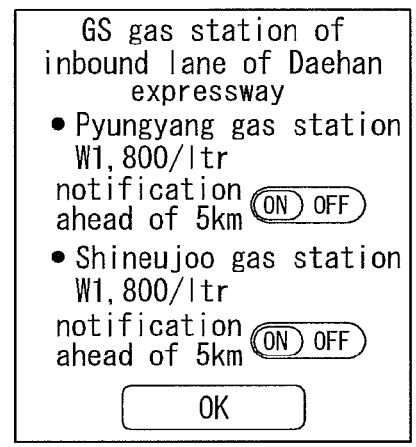
(b)
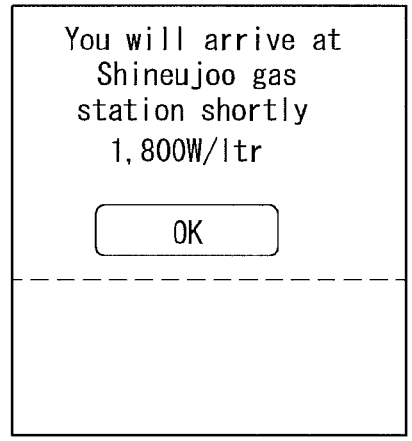
(c)

FIG. 17
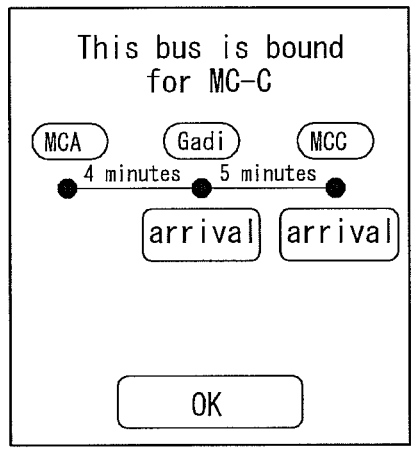
(a)
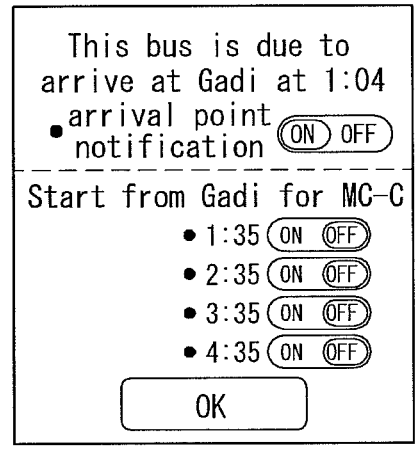
(b)
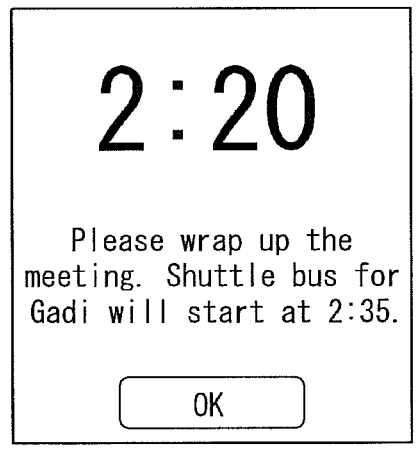
(c)

FIG. 18
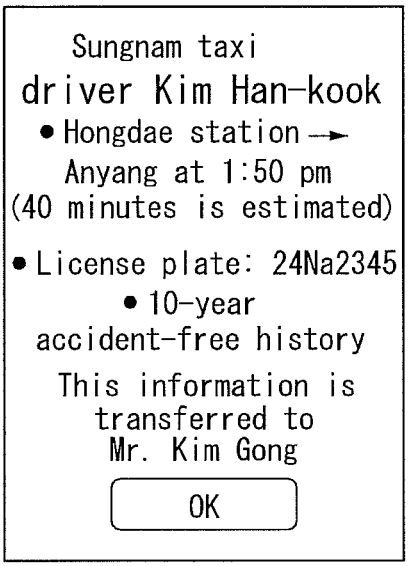
(a)
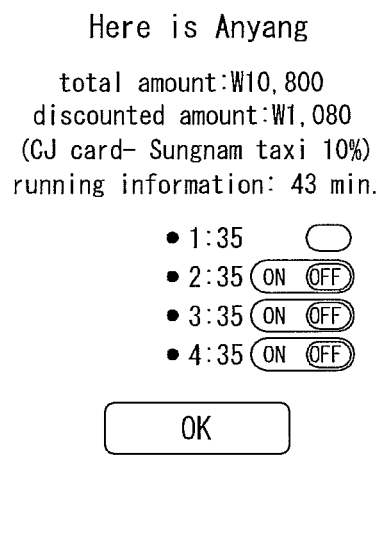
(b)
(c)

FIG. 21
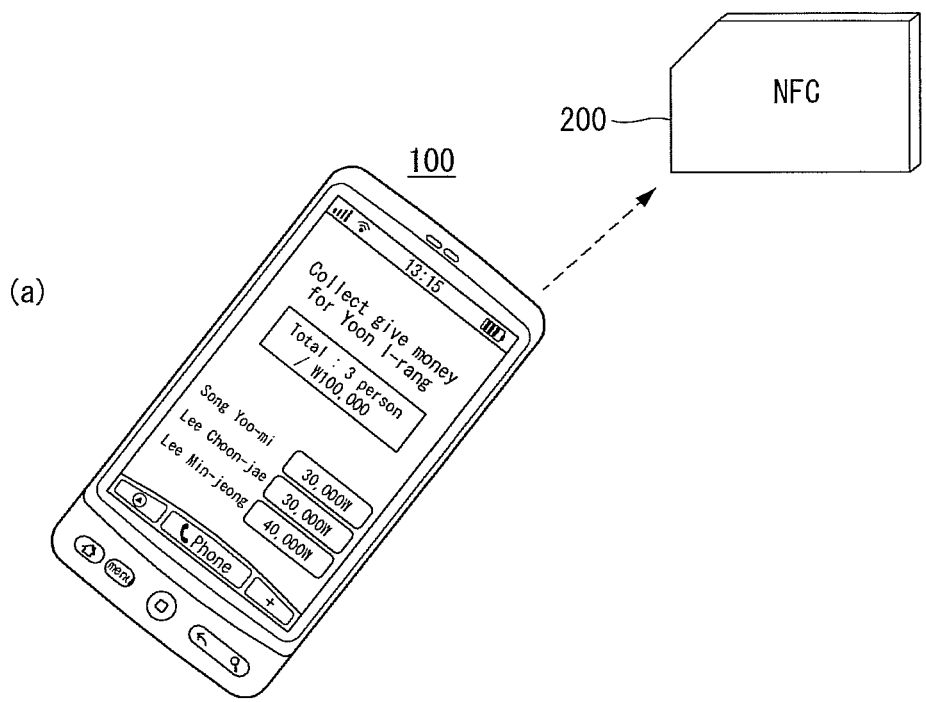
(a)
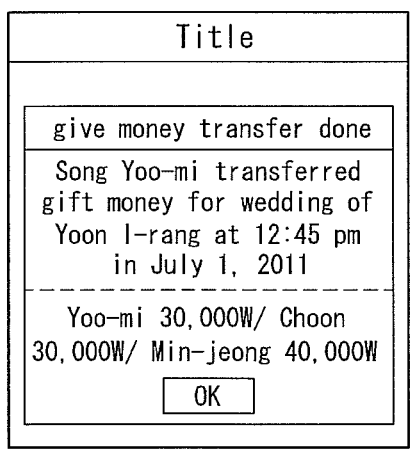
(b)
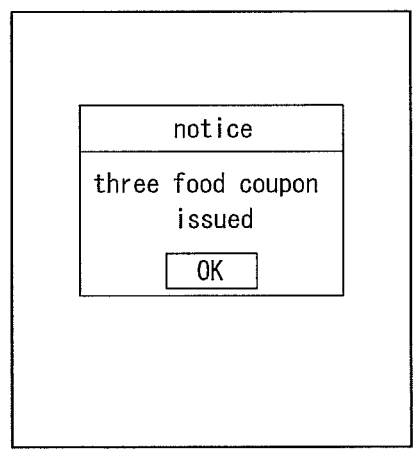
(c)

FIG. 23
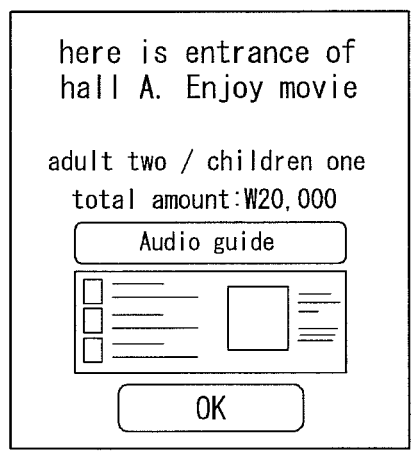
(a)
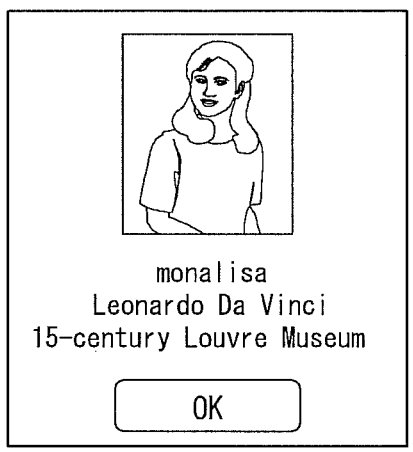
(b)
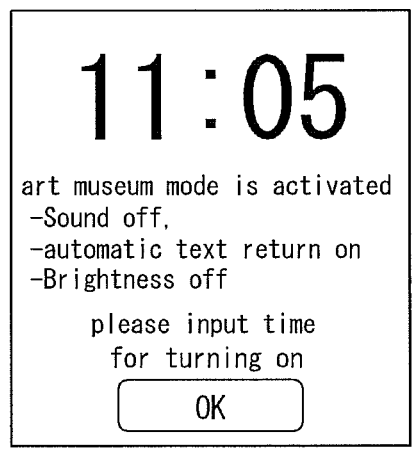
(c)

FIG. 24

151 card is read total attendance:11/20 attendance check text down load view time table of other classes (a)

151 attendance check

OK (b)

151 toeic reference room

| No. | title |
|---|---|
| 2518 | |
| 2517 | |
| 2516 | |
| 2515 | |
| 2514 | |
| 2513 | |
| 2512 | |

① ② ③ ④ ⑤ ⑥ ⑦

(c)

151 view time table of other classes (d)

payment is made by card payment is made by card:5,000 balance:50,000 total expense details:45,000 total number of use: 10 check card charge (b)

password

| Q | W | E | R | T | Y | U | I | O | P |
| A | S | D | F | G | H | J | K | L |
| ⇧ | Z | X | C | V | B | N | M | ⌫ |
| 123 | 🌐 | space | @ | . | return |

(c)

Woork bank 000-000-000 account balance: 520,000 remittance amount: 20,000 remit (d)

20,000 Won is remitted by check card current total amount of check card is 70,000Won

FIG. 26
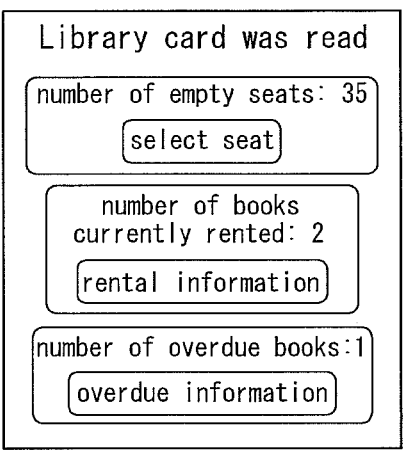
(a)
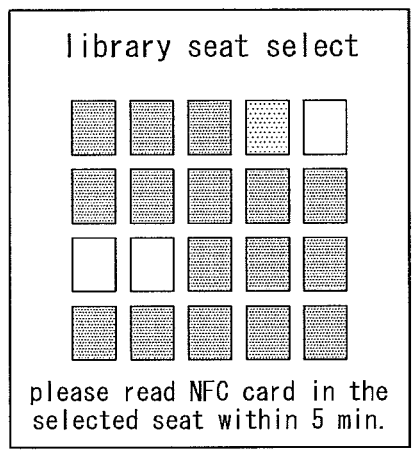
(b)
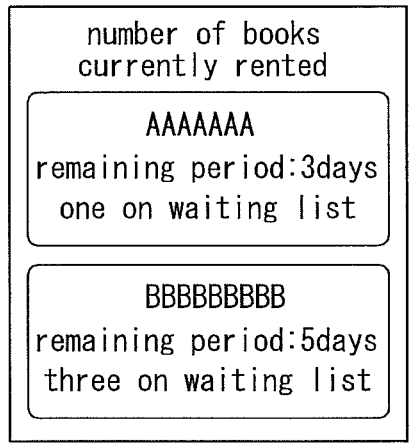
(c)
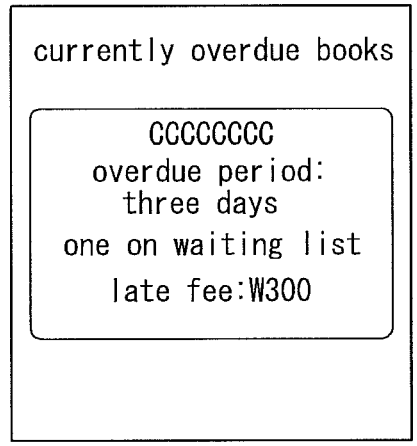
(d)

MOBILE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2011-0095154, filed on Sep. 21, 2011, the contents of which are incorporated by reference herein in their entirety.

TECHNICAL FIELD

The present invention relates to a mobile terminal and a control method thereof, and more particularly, to a mobile terminal capable of obtaining pertinent information based on information obtained through a short-range communication link, thus providing various services by using short-range communication, and a control method thereof.

DISCUSSION OF THE RELATED ART

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

In addition, recently, there has been an attempt to make payment for an article by using near field communication.

SUMMARY

The present invention relates to a mobile terminal capable of obtaining pertinent information based on information obtained through a short-range communication link, thus providing various services by using short-range communication, and a control method thereof.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 8 is a view illustrating pertinent information of the mobile terminal according to an embodiment.

FIGS. 9 and 10 are views illustrating pertinent information of the mobile terminal according to another embodiment.

FIGS. 11 to 13 are views illustrating pertinent information of the mobile terminal according to another embodiment.

FIGS. 14 and 15 are views illustrating pertinent information of the mobile terminal according to another embodiment.

FIG. 16 is a view illustrating pertinent information of the mobile terminal according to another embodiment.

FIG. 17 is a view illustrating pertinent information of the mobile terminal according to another embodiment.

FIG. 18 is a view illustrating pertinent information of the mobile terminal according to another embodiment.

FIGS. 20 and 21 are views illustrating pertinent information of the mobile terminal according to another embodiment.

FIG. 23 is a view illustrating pertinent information of the mobile terminal according to another embodiment.

FIG. 24 is a view illustrating pertinent information of the mobile terminal according to another embodiment.

FIG. 25 is a view illustrating pertinent information of the mobile terminal according to another embodiment.

FIG. 26 is a view illustrating pertinent information of the mobile terminal according to another embodiment.

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
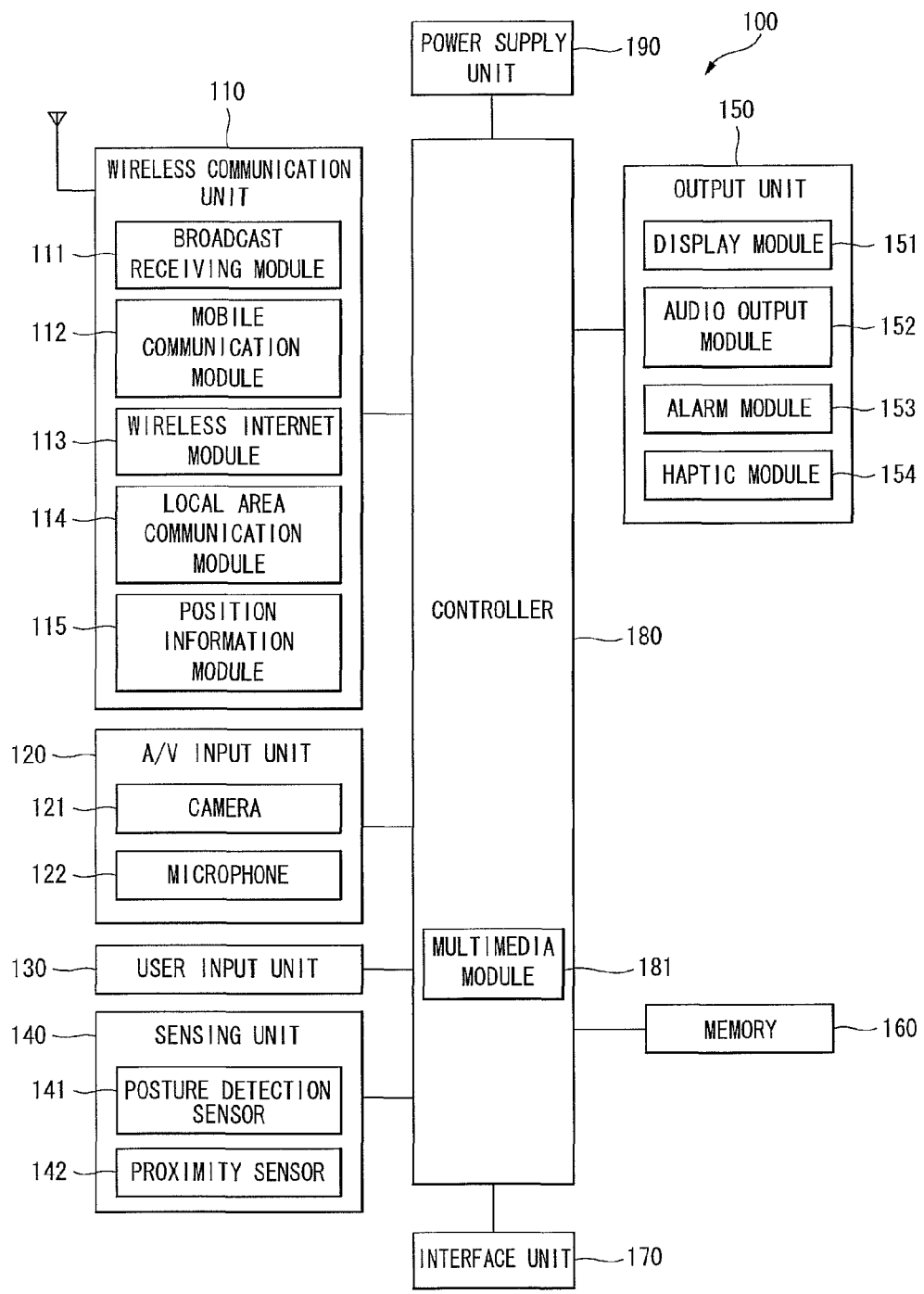
FIG. 1 is a block diagram of a mobile terminal according to an embodiment.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification, (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2:
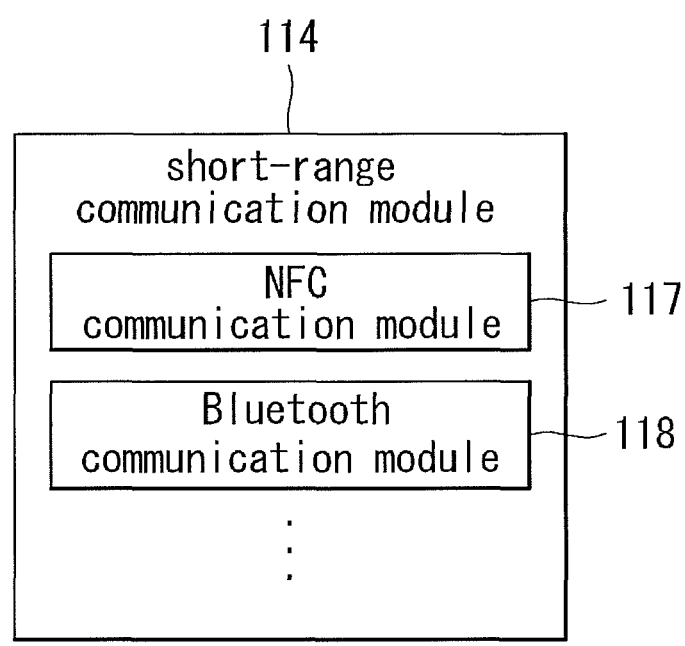
FIG. 2 is a detailed block diagram of a short range communication module of the mobile terminal according to an embodiment.

FIG. 2 is a detailed block diagram of the short range communication module 114 of the mobile terminal 100 according to an embodiment. With reference to FIG. 2, the short range communication module 114 may include an NFC communication module 117, a Bluetooth communication module 118, or the like.

The NFC communication module 117 may perform data communication with devices located within 10 cm (preferably, within 4 cm) by using a very short range contactless data transfer technology in relation to RFID (Radio Frequency IDentification). An electronic device adopting NFC technology may communicate with a different electronic device adopting the NFC technology through, for example, at least one of a reader mode, a card emulation mode, and a peer-to-peer mode. The NFC communication module 117 will be described in more detail with reference to FIG. 3 later.

The Bluetooth communication module 118 may perform data communication with devices present within a radius ranging from 10 m to 100 m by using Bluetooth, one of short-range wireless communication standard. For reference, Bluetooth is a short-range wireless networking technology jointly developed by a Bluetooth special interest group (SIG) organized by five companies including Ericsson, and the like, in 1998.

The block diagram illustrated in FIG. 2 merely shows an example of the short-range communication module 114 of the mobile terminal 100 according to an embodiment, and the components thereof are not essential and the short-range communication module 114 may include fewer or greater components than that illustrated in FIG. 2.

The configuration of the mobile terminal 100 according to an embodiment has been described with reference to FIGS. 1 and 2. Hereinafter, features of the mobile terminal 100 according to an embodiment capable of forming (or establishing) a plurality of communication links with different electronic devices will be described in detail.

Figure 3:
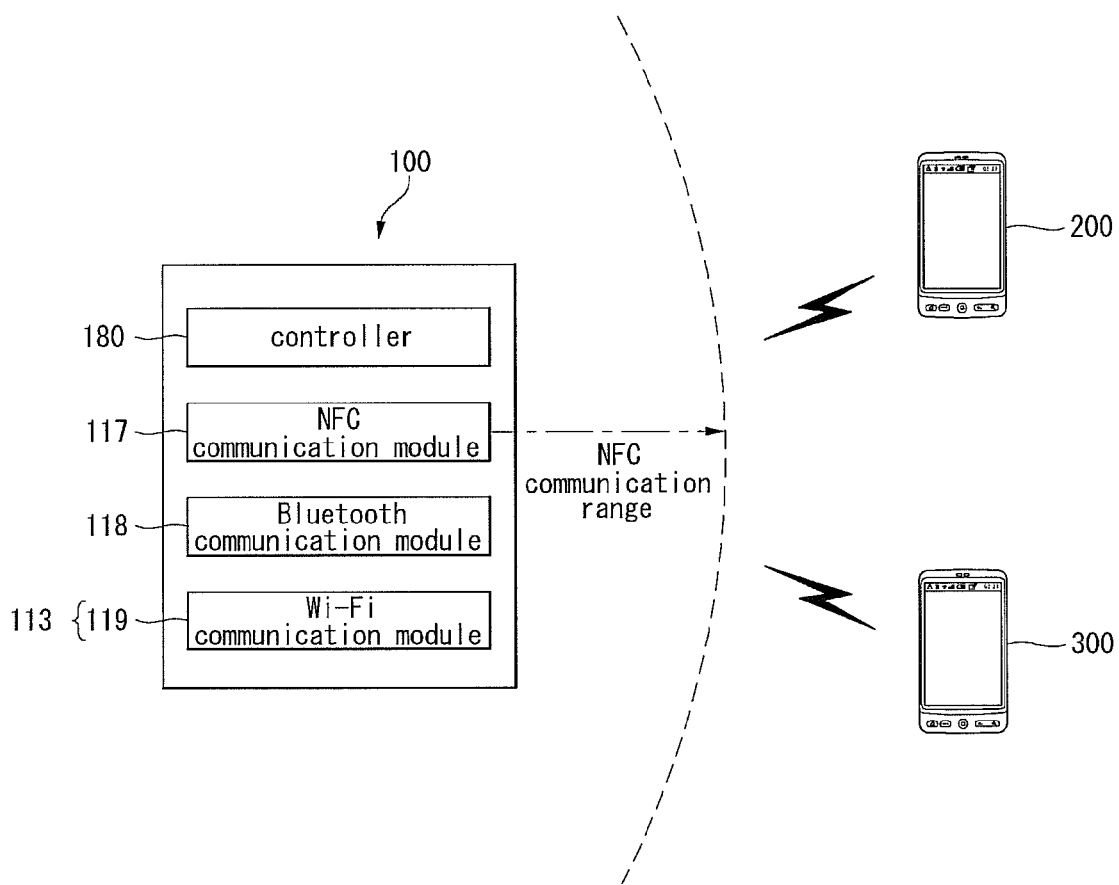
FIG. 3 is a view illustrating a system environment including the mobile terminal according to an embodiment.

FIG. 3 is a view illustrating a system environment including the mobile terminal 100 according to an embodiment. As illustrated in FIG. 3, it can be seen that the system environment may include the mobile terminal 100 and one or more different electronic devices 200 and 300 that may be able to form an NFC link with the mobile terminal 100.

The components of the system environment are not essential and system environment may include fewer or greater components than those illustrated in FIG. 3. Also, FIG. 3 briefly shows the components required for forming a communication link in order to largely describe the features of a formation of a communication link of the mobile terminal 100.

In FIG. 3, the system environment is implemented by the mobile terminals 100, 200, and 300, but the electronic devices 100, 200, and 300 mentioned in this document may be certain electronic devices supporting NFC communication. Namely, the electronic devices 100, 200, and 300 may be mobile terminals such as a mobile phone, a smart phone, a tablet PC, or the like, or may be electronic devices such as a printer, a TV, a DTV, a computer, audio equipment, or the like. Hereinafter, an electronic device having the NFC communication function may be referred to as an NFC electronic device.

Also, in FIG. 3, the mobile terminal 100 may form an NFC link with the different electronic devices 200 and 300 based on the NFC communication technology, a type of short-range communication technology, but the scope of the present invention is not limited thereto. For example, the mobile terminal 100 may form a wireless communication link with the different electronic devices 200 and 300 by using a short-range wireless communication technology other than the NFC communication technology.

With reference back to FIG. 3, the mobile terminal 100 includes the controller 180, the NFC communication module 117, the Bluetooth communication module 118, and the Wi-Fi communication module 119.

The controller 180 may control the components of the mobile terminal 100. The NFC communication module 117 may allow the mobile terminal 100 to form an NFC link with the different electronic devices 200 and 300 supporting NFC communication. The NFC communication module 117 may be an NFC forum device. In this document, the NFC communication module may be referred to as a short-range communication unit.

As shown in FIG. 3, the NFC communication module 117 may form an NFC link with NFC communication modules of the different electronic devices 200 and 300 through tagging within an NFC communication range.

The NFC communication module 117 may communicate with the NFC communication modules of the different electronic devices 200 and 300 in various modes. For example, the various modes may include a card emulation mode, a reader mode, and a peer-to-peer mode.

When the NFC communication module 117 operates in the card emulation mode, the NFC communication module 117 of the mobile terminal 100 may serve as a card, i.e., a tag. In this case, the NFC communication modules of the different electronic devices 200 and 300 may operate in the reader mode to obtain data from the NFC communication module 117 of the mobile terminal 100.

When the NFC communication module 117 operates in the reader mode, the NFC communication module 117 of the mobile terminal 100 may serve as a reader. In this case, the NFC communication module 117 of the mobile terminal 100 may obtain data from the NFC communication modules of the different electronic devices 200 and 300 operating in the card emulation mode.

When the NFC communication module 117 operates in the peer-to-peer mode, the NFC communication module 117 of the mobile terminal 100 and those of the different electronic devices 200 and 300 may exchange data.

The mode of the NFC communication module 117 may be determined according to a predetermined reference. For example, the mode of the NFC communication module 117 may be set according to a user input or a predetermined algorithm.

After the mobile terminal 100 forms an NFC link with the different electronic devices 200 and 300 through the NFC communication module 117, the mobile terminal 100 may form a type of communication link, different from the NFC link, with the different electronic devices 200 and 300 through the Bluetooth communication module 118 and/or the Wi-Fi communication module 119. Then, even if the NFC communication link is cut off, the mobile terminal 100 can continue to perform data communication with the different electronic devices 200 and 300 through the Bluetooth communication link and/or the Wi-Fi communication link.

In this document, the sequential process of forming a different communication link by the mobile terminal 100 with the different electronic devices 200 and 300 in order to continuously communicate with the different electronic devices 200 and 300 by using a different wireless communication technology, in the state in which the NFC links is formed, will be referred to as handover.

With reference to FIG. 3, the mobile terminal 100 according to an embodiment may know that handover can be performed from the NFC communication link to the Bluetooth communication link and the Wi-Fi communication link, but the scope of the present invention is not limited thereto. For example, the mobile terminal 100 may perform handover to various communication links such as an RFID (radio frequency identification) communication link, a WiGig (Wireless Gigabit) communication link, or the like.

Although not shown in FIG. 3, the different electronic devices 200 and 300 may include components corresponding to those of the mobile terminal 100. Namely, the different electronic devices 200 and 300 may include a controller, an NFC communication module, a Bluetooth communication module, and a Wi-Fi communication module.

In other words, handover refers to performing data communication by forming a different communication link in a state in which the mobile terminal 100 has formed an NFC link with the different electronic devices 200 and 300. Here, the user may easily form an NFC link through NFC tagging between the mobile terminal 100 and the different electronic devices 200 an 300 and change a communication means into a substitute communication link appropriate for a remote and/or high capacity data transmission, in comparison to the NFC link.

Hereinafter, a handover process of the mobile terminal 100 according to an embodiment will be described in detail with reference to the accompanying drawings. For the convenience of explanation, the system environment illustrated in FIG. 3 will be referred to. However, this is merely for the convenience of explanation and the technical concept of the present invention is not meant to be limited to a particular environment or a particular device.

Figure 4:
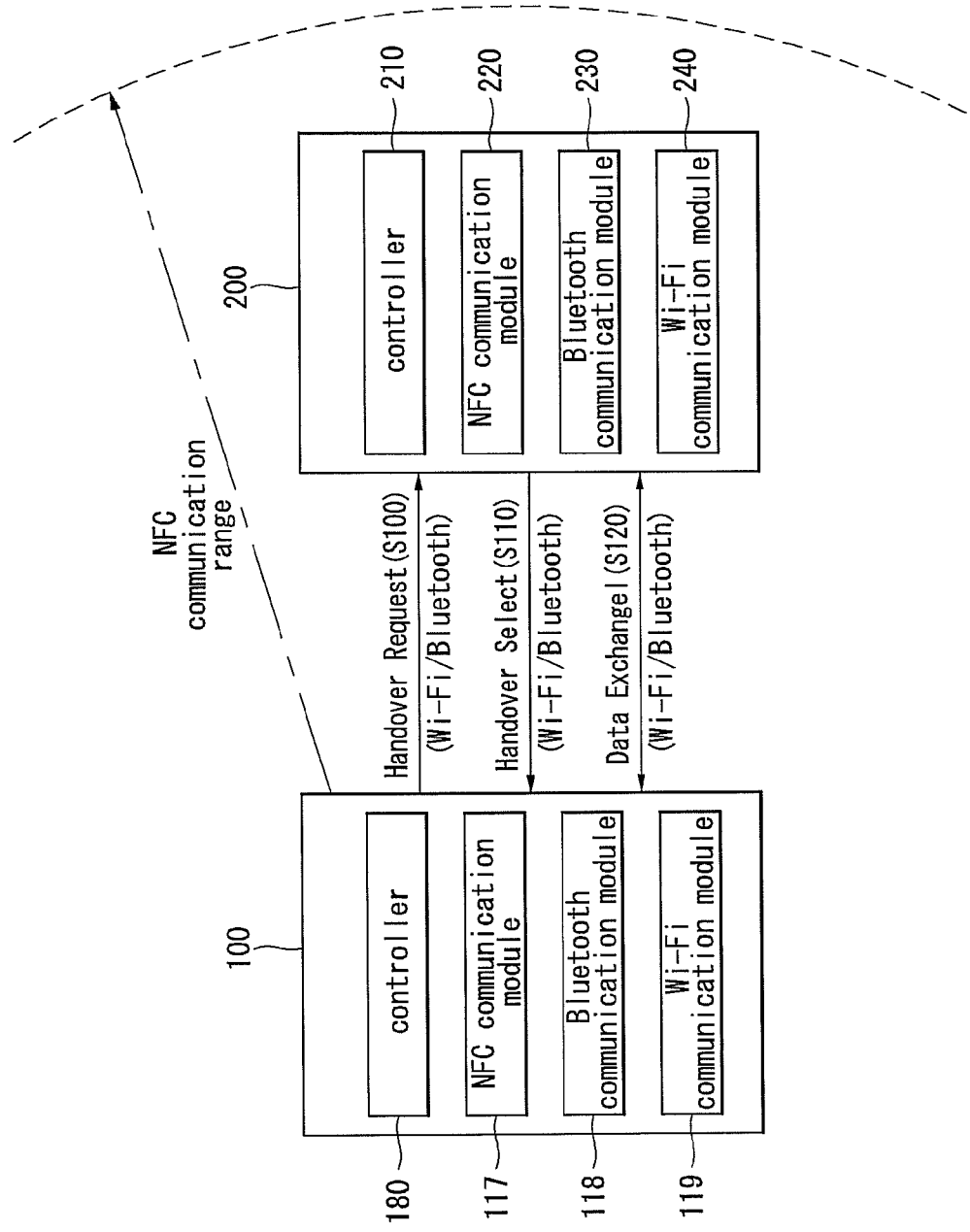
FIG. 4 is a view illustrating an example of forming (or establishing) a communication link by the mobile terminal with a different electronic device according to an embodiment.

FIG. 4 is a view illustrating an example of forming a communication link by the mobile terminal with the different electronic device 200 according to an embodiment. Hereinafter, the process of forming a communication link will be described with reference to the related drawings.

With reference to FIG. 4, the mobile terminal 100 may transmit a handover request message to the different electronic device 200 (S110). Before step S110, the mobile terminal 100 and the different electronic device 200 may form a communication link through a first communication unit. For example, as shown in FIG. 4, the mobile terminal 100 may form an NFC link through tagging with respect to the NFC communication module 220 included in the different electronic device 200.

With the NFC link established, the mobile terminal 100 may transmit a message for requesting handover, e.g., a handover request message, to the different electronic device 200 through the NFC link.

By transmitting the handover request message to the different electronic device 200, the mobile terminal 100 may initiate a protocol for forming a different communication link through the NFC link formed currently between the mobile terminal 100 and the different electronic device 200.

Here, the mobile terminal may be in a position of a handover requester, while the different electronic device 200 may be in a position of a handover selector. The handover requester may refer to a device initiating a handover protocol by transmitting the handover request message to the different NFC electronic device, and the handover selector may refer to an NFC device configuring a handover selection message in response to the received handover request message and making a response.

Namely, the handover requester (i.e., the handover requesting device) and the handover selector (i.e., the handover selecting device) are based on relative concepts determined whether they choose to transmit the handover request message or the handover selection message. Thus, as a matter of course, according to circumstances, when the different electronic device 200 transmits the handover request message to the mobile terminal 100, the mobile terminal 100 may become a handover selector and the different electronic device 200 may become the handover requester.

The handover request message may include information regarding a different communication module supported by the mobile terminal 100. For example, as shown in FIG. 4, when the mobile terminal 100 supports Bluetooth and Wi-Fi, the handover request message may include information regarding Bluetooth and Wi-Fi supported by the mobile terminal 100.

Communication technologies supported by the mobile terminal 100 used for handover may have determined priority. For example, as shown in FIG. 4, the handover request message may include information regarding a communication module supporting a communication technology having high priority as described at the front side and information regarding a communication module supporting a communication technology having low priority as described at the rear side. With reference to the handover request message illustrated in FIG. 4, it can be seen that the information regarding Wi-Fi communication module has higher priority than that of the information regarding the Bluetooth communication module.

Upon receiving the handover request message, the different electronic device 200 may transmit a response with respect to the handover request message to the mobile terminal 100 (S120). For example, the different electronic device 200 may generate a handover selection message as an example of a response with respect to the handover request message, and transmit the generated handover selection message to the mobile terminal 100 through the NFC link.

Here, the different electronic device 200 may analyze the handover request message to determine what kinds of communication modules are included in the mobile terminal 100, and provide information regarding a communication module included in the different electronic device 200 to the mobile terminal 100 according to the determination. Namely, the information regarding a communication module included in the handover selection message may include information regarding a communication module included in the different electronic device 200, among communication modules included in the mobile terminal 100.

With reference to FIG. 4, it can be seen that a controller 210 of the different electronic device 200 analyzes the received handover request message, determines that the Bluetooth communication module 118 and the Wi-Fi communication module 119 are included in the mobile terminal 100, and then, transmits a handover selection message including information regarding a Bluetooth communication module 230 and a Wi-Fi communication module 240 included in the different electronic device 200 to the mobile terminal 100.

When the handover selection message is received from the different electronic device 200, the controller 180 of the mobile terminal 100 may analyze the handover selection message to check that the Bluetooth communication module 230 and the Wi-Fi communication module 240 are included in the different electronic device 200, and obtain corresponding information.

Thereafter, the mobile terminal 100 forms a communication link with the communication modules included in the different electronic device 200 based on the obtained information, and then, perform data communication with the different electronic device 200 through the established communication link (S120).

For example, in order to change the NFC communication link with the different electronic device 200 to the Bluetooth communication link, the controller 180 of the mobile terminal 100 may perform Bluetooth paring with the different electronic device 200. Accordingly, the mobile terminal 100 may change the communication link with the different electronic device 200 from the NFC communication link to the Bluetooth communication link to continue to perform communication according to the Bluetooth protocol.

As the communication link between the mobile terminal 100 and the different electronic device 200 is handed over from the NFC communication link to the Bluetooth communication link, even if the mobile terminal 100 and the different electronic device 200 remain no longer within the NFC communication range, they can perform data communication and advantageously exchange data at a transfer rate faster than that of the NFC link.

In other words, when the mobile terminal 100 is a smart phone, the user may bring the smart phone to the vicinity of the different electronic device 200 and perform tagging with the different electronic device 200 to thereby form an NFC link, and perform a handover protocol to thereby change the communication unit to the Bluetooth communication link. Then, even if the user brings the smart phone to the outside of the NFC communication range, the smart phone and the different electronic device 200 may continue to perform data communication through the Bluetooth communication link.

Also, in order to change the NFC communication link with the different electronic device 200 to the Wi-Fi communication link, the controller 180 of the mobile terminal 100 may perform a process of forming a Wi-Fi communication link with the different electronic device 200 and perform data communication with the different electronic device 200 through the established Wi-Fi communication link. Then, the mobile terminal 100 may perform data communication with the different electronic device 200 at a data transmission/reception rate faster than that of the NFC communication link even at an outer side of the NFC communication range.

Here, when there are a plurality of communication links to which the NFC communication link can be changed, the controller 180 of the mobile terminal 100 may perform handover only to a communication link selected from among the plurality of communication links or may perform handover to all of the plurality of communication links. Also, when the controller 180 selects communication links to perform handover thereto from among the plurality of communication links, the controller 180 may select the communication links according to predetermined priority.

So far, the process of performing handover by the mobile terminal 100 according to an embodiment from a communication link (e.g., the NFC communication link) formed with a communication module included in the different electronic device 200 to at least one of communication links (e.g., Bluetooth communication link, Wi-Fi communication link, etc.) with a different communication module included in the different electronic device 200 has been described with reference to FIGS. 3 and 4.

Figure 5:
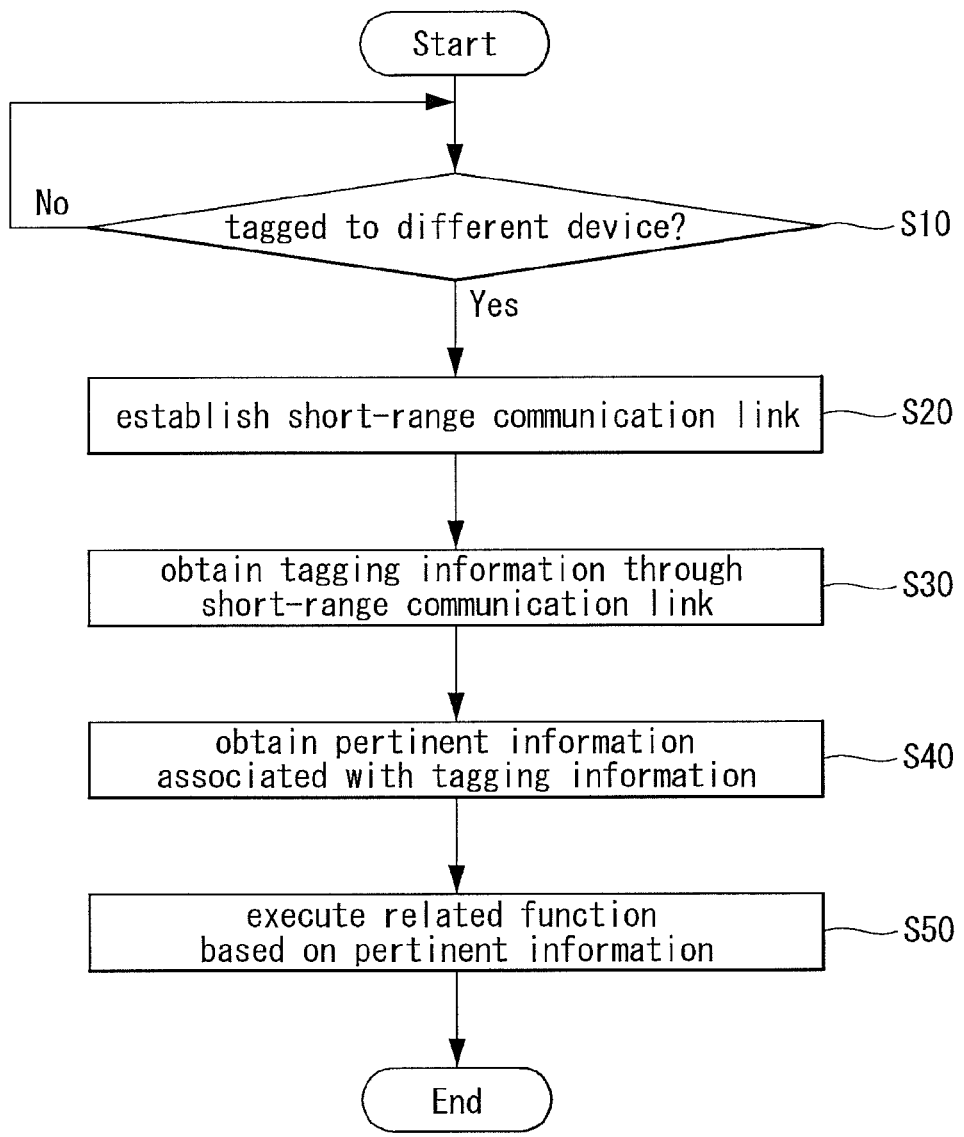
FIG. 5 is a flow chart illustrating an operation of the mobile terminal according to an embodiment.

FIG. 5 is a flow chart illustrating an operation of the mobile terminal according to an embodiment.

As illustrated, the controller 180 of the mobile terminal 100 according to an embodiment may determine whether or not tagging to a different device has made (S10).

Tagging may refer to an operation of bringing the mobile terminal 100 such that it is closer by more than a certain distance to the different terminal 200. The user holding the mobile terminal 100 in his hand may bring the mobile terminal 100 close to the different terminal to induce tagging. The different terminal 200 may be an electronic device available for NFC communication or a tag available for NFC communication.

When tagging is performed, a step (S20) of forming a short-range communication link may be performed.

When tagging is performed, a communication link using the short-range communication module (114 in FIG. 1) may be formed between the different terminal 200 and the mobile terminal 100. For example, an NFC communication link may be formed therebetween. When the NFC communication link is formed, data may be exchanged therethrough.

A step (S30) of obtaining tagging information through the short-range communication link may be performed.

The short-range communication link may be a communication link using the short-range communication module (114 in FIG. 1) of the mobile terminal. The short-range communication link may be an NFC communication link. When the NFC communication link is formed, data may be exchanged therethrough. Or, data may be transmitted from the different device 200 to the mobile terminal 100 through the NFC communication link.

Exchanging and/or transmission of data through the short-range communication link may be performed based on a particular short-range communication protocol. As mentioned above, short-range communication may be performed according to a scheme such as Bluetooth, Infrared ray, UWB, ZigBee, or the like. Hereinafter, it is assumed that short-range communication is performed based on an NFC scheme for the sake of explanation.

When short-range communication based on an NFC scheme is performed, the mobile terminal 100 and the different device 200 may exchange and/or transmit data according to an NDEF (NFC Data Exchange Format). Data obtained by the mobile terminal 100 according to an embodiment from the different device 200 may be a data format following the NDEF. However, required information can be added in a certain field of the NDEF.

Tagging information may be information indicating what kind of tagging it is while short-range communication based on the NFC scheme is being performed. Namely, tagging information may include information regarding an event which has occurred due to the tagging. For example, tagging information may indicate whether or not it is tagging for paying for an article (or goods), tagging for a point transmission, tagging for the use of transportation, tagging for the use of a particular service, tagging for remittance, or the like.

A step (S40) of obtaining pertinent information associated with tagging information and a step (S50) of executing a related function based on the pertinent information may be performed.

The pertinent information may be information that can be obtained based on tagging information. For example, when tagging is performed for a payment, information regarding for which article or service the payment was made may be obtained as pertinent information. This may be clearly understood from the following example. Namely, when tagging for purchasing an article is performed, information regarding whether or not there is a point, or the like, in relation to the purchase of the article may be pertinent information. The controller 180 may obtain pertinent information from an external server, or the like, based on the tagging information for purchasing the article.

Upon obtaining the pertinent information, the controller 180 may execute a related function. For example, when a point associated with a purchase of a particular article is obtained, a procedure allowing the user to check the point or use the point may be performed. The function associated with the obtained pertinent information will be described in detail in a corresponding section.

Figure 6:
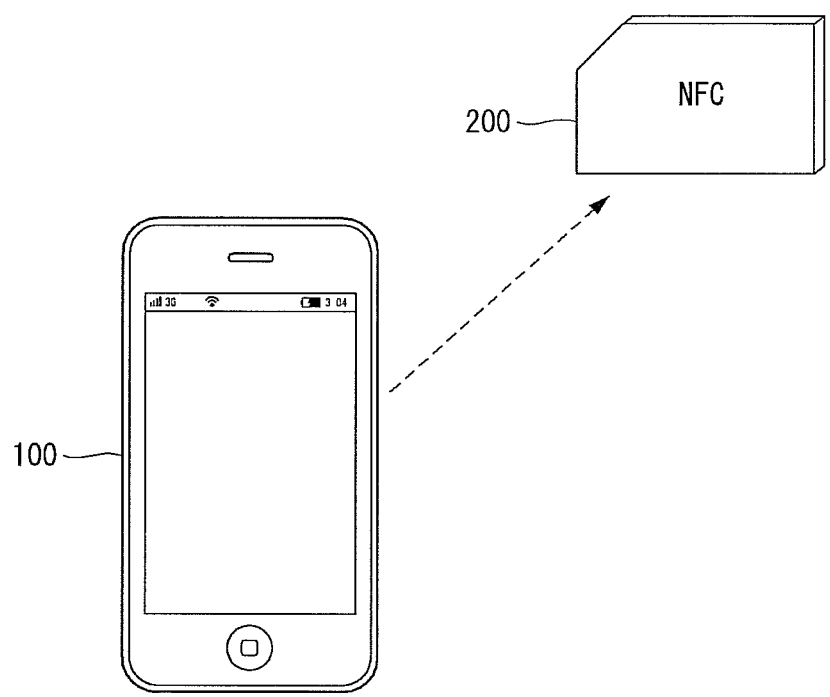
FIG. 6 is a view illustrating tagging of the mobile terminal of FIG. 5.

FIG. 6 is a view illustrating tagging of the mobile terminal of FIG. 5.

Tagging may refer to an operation of bringing the mobile terminal 100 such that it is closer by more than a certain distance to the different terminal 200. The user holding the mobile terminal 100 in his hand may bring the mobile terminal 100 close to the different terminal to induce tagging. The different terminal 200 may be an electronic device available for NFC communication or a tag available for NFC communication.

When tagging is performed, a communication link using the short-range communication module (114 in FIG. 1) may be formed between the different terminal 200 and the mobile terminal 1000. For example, an NFC communication link may be formed therebetween. When the NFC communication link is formed, data may be exchanged therethrough.

Figure 7:
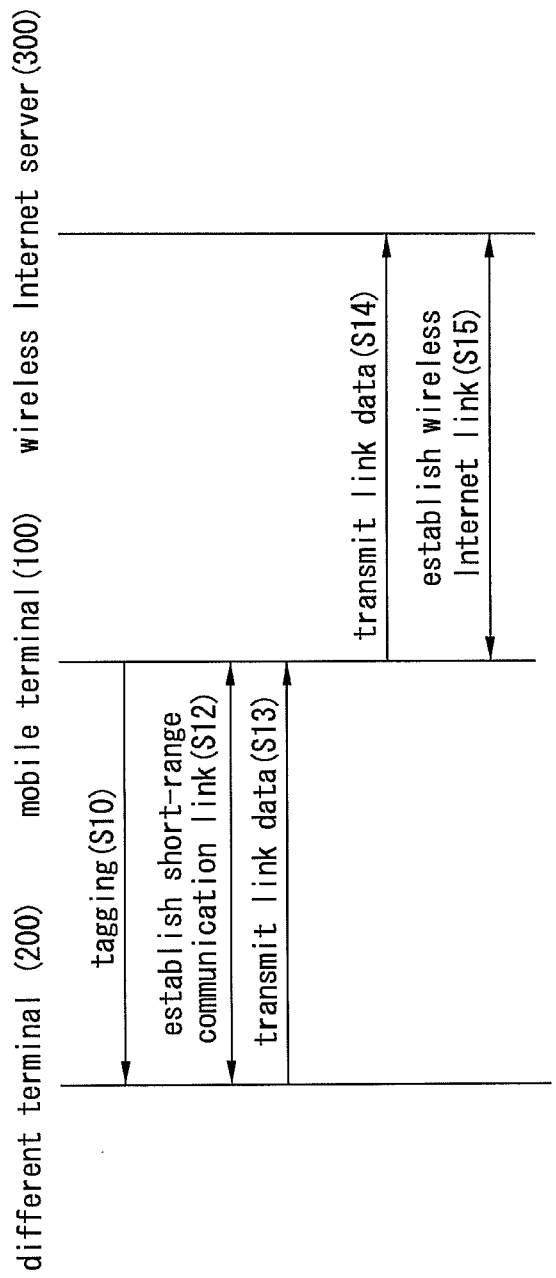
FIG. 7 is a view illustrating a signal flow between the mobile terminal, a different terminal, and a wireless Internet server according to an embodiment.

FIG. 7 is a view illustrating a signal flow between the mobile terminal, the different terminal, and a wireless Internet server according to an embodiment.

As illustrated, the mobile terminal 100 according to an embodiment may be tagged to the different terminal 200 (S10).

When the mobile terminal 100 is tagged to the different terminal 200, a step (S12) of forming a short-range communication link may be performed. Namely, for example, an NFC communication link may be established.

When the short-range communication link is formed, link data may be transmitted from the different terminal 200 to the mobile terminal 100 (S13). The link data may be data required for handover.

The mobile terminal 100 may transmit the link data to the wireless Internet server 300 (S14), based on which a wireless Internet link may be formed (S15).

The wireless Internet server 300 may be a different electronic device having a management attribute with respect to communication using the wireless Internet. The wireless Internet server 300 may communicate with the mobile terminal 100 through an AP (Access Point).

By transmitting the link data, a wireless Internet link may be formed between the mobile terminal 100 and the wireless Internet server 300. Namely, handover may be performed from the short-range communication link to the wireless Internet link.

The controller 180 may obtain tagging information and/or pertinent information by using the short-range communication link and/or the wireless Internet link formed by tagging. Namely, for example, tagging information may be obtained through the short-range communication link and the pertinent information may be obtained through the wireless Internet link. In this case, the pertinent information which may be large in volume can be easily obtained through the wireless Internet link.

FIG. 8 is a view illustrating pertinent information of the mobile terminal according to an embodiment.

As illustrated, based on user's payment information, the controller 180 of the mobile terminal 100 according to an embodiment may display pertinent information associated with the payment.

As shown in FIG. 8(*a*), the controller 180 may display payment information on the display 151. The payment information may be obtained through an operation of tagging the mobile terminal 100 to a different device. Namely, for example, the payment information may be obtained through a short-range communication link formed by an operation of tagging the mobile terminal 100 to a different device which is available for NFC communication and has a payment function.

The controller 180 may display pertinent information based on the obtained payment information. Namely, for example, the controller 180 may display the fact that the user may make a client evaluation and/or participate in an event in association with the paid article or service on the display 151. The pertinent information may be obtained through a short-range communication link and/or wireless Internet link though which the payment information was obtained.

The pertinent information may be obtained from an external server which provides the information. The external server may be a server managed by a seller of the particular for which the user made payment or a person related to the seller.

As shown in FIG. 8(*b*), when the user selects client evaluation with his finger (F), or the like, the controller 180 may display a related screen for evaluating service satisfaction.

As shown in FIG. 8(*c*), the controller 180 may display a discount coupon obtained in return for the evaluation of the service satisfaction. Namely, the discount coupon may be pertinent information associated with payment information as tagging information according to tagging. The providing of the discount coupon as information associated with the tagging information may obtain an effect that the user purchases the service and/or article again later.

Figure 9:
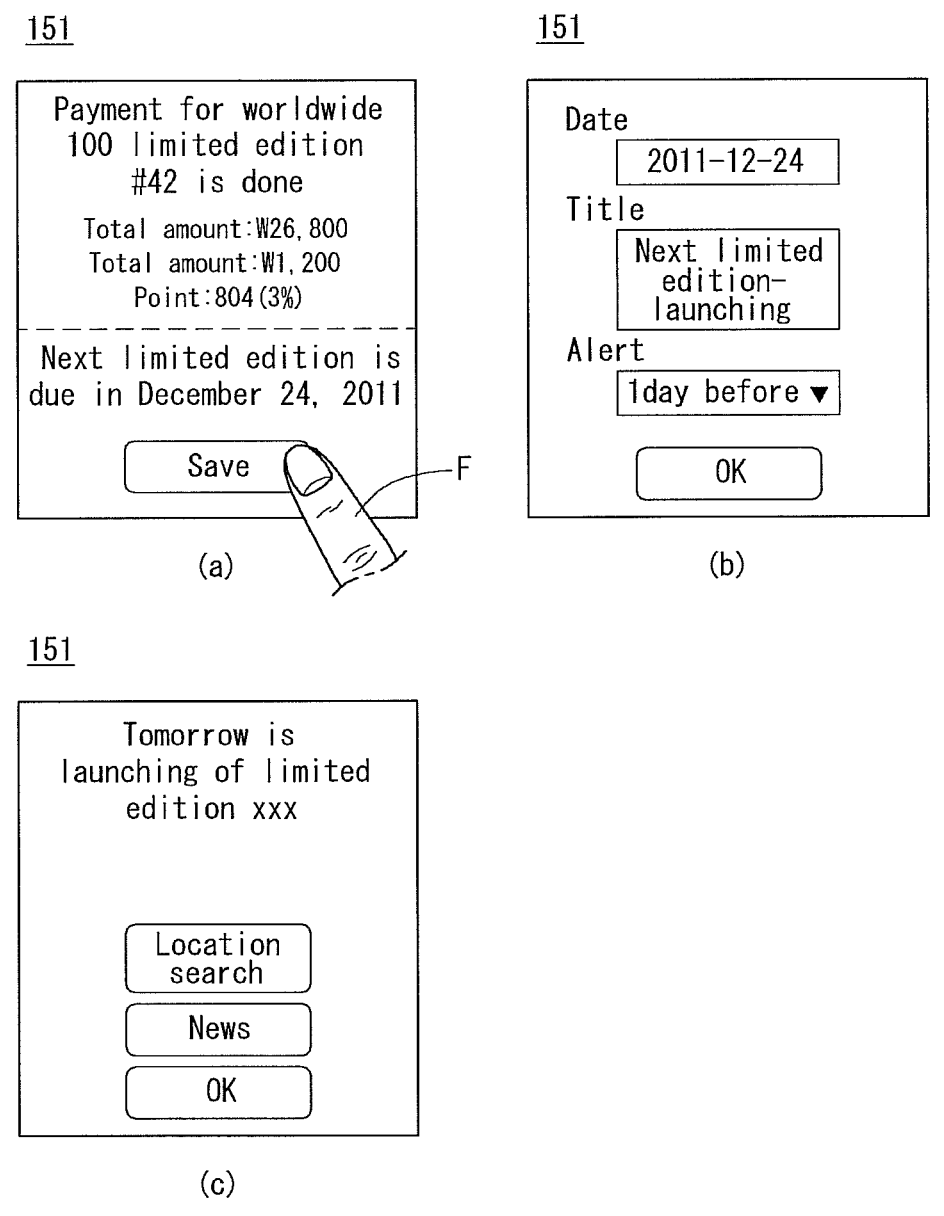

FIGS. 9 and 10 are views illustrating pertinent information of the mobile terminal according to another embodiment.

As shown in FIGS. 8 and 10, when payment is made through NFC, the mobile terminal 100 according to an embodiment may obtain and display pertinent information associated with the payment.

As shown in FIG. 9(*a*), when the user purchases a particular article, the user may perform an operation of tagging to a different device available for payment through NFC to make payment for the particular article. When payment is made through tagging, information associated with the payment may be displayed on the display 151. For example, information such as a payment amount, a discount amount, collected points, and the like, may be displayed. In addition, information regarding the corresponding article may be further displayed and the user may select saving of the pertinent information.

As shown in FIG. 9(*b*), the user may select a condition for demonstrating information associated with the corresponding article. Namely, for example, content regarding at which timing information regarding when a next edition of the purchased article is to be launched may be displayed.

As shown in FIG. 9(*c*), when a pre-set particular timing arrives, the corresponding information may be displayed for the user recognition. When the information is displayed, a pertinent menu for displaying a place at which the article is sold and/or information associated with the article may also be displayed.

As shown in FIG. 10(*a*), when payment for the particular article is made through NFC tagging, a menu for confirming whether to download an application associated with the article, as pertinent information, may be displayed.

As shown in FIG. 10(*b*), when the user selects the application associated with the article, a guide image for installing the application may be displayed. The user may install the application associated with the purchased article based on the displayed pertinent information.

Figure 12:
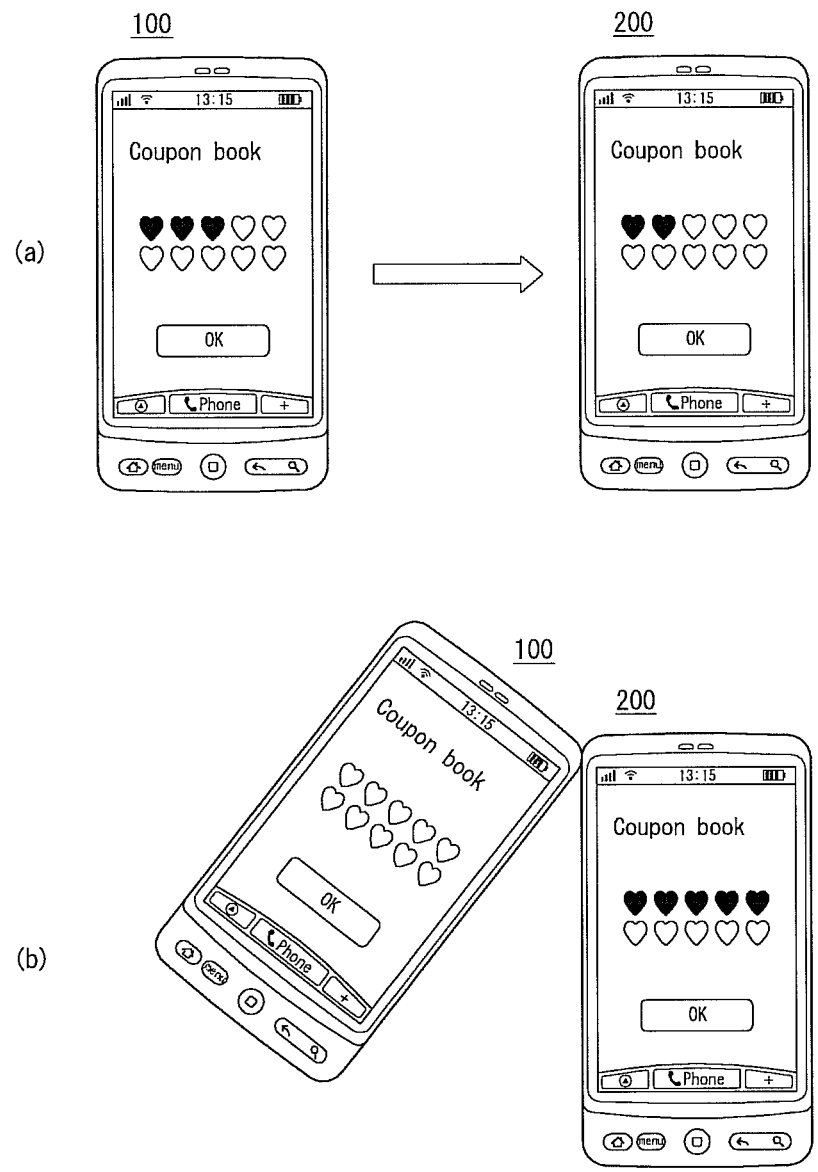

FIGS. 11 to 13 are views illustrating pertinent information of the mobile terminal according to another embodiment.

As shown in FIGS. 11 to 13, when payment is made through NFC tagging, the controller 180 of the mobile terminal 100 may issue a coupon, or the like, as pertinent information to induce the user to repeatedly use the article and/or service.

As shown in FIG. 11(*a*), when payment for the article and/or service is made through the NFC tagging operation, the fact that payment has been normally made may be displayed. Also, the controller 180 may display coupling information as information associated with the payment along with the fact of the payment. The coupon information may be a benefit provided to the user who has paid according to the corresponding payment. It means that, for example, when the user collects coupons equal to or greater than a particular number, the user may reap the benefit of purchasing articles and/or services at discount prices.

As shown in FIG. 11(*b*), when pertinent information indicating that coupons equal to or greater than the particular number is obtained, the controller 180 may display the fact that an article may be provided later for free.

As shown in FIG. 12(*a*), the mobile terminal 100 and the different mobile terminal 200 may have collected coupons.

As shown in FIG. 12(*b*), the mobile terminal 100 may be brought into contact with the different mobile terminal 200 (or the mobile terminal 100 may be allowed to collide with the different mobile terminal 200). When the mobile terminal 100 is brought into contact with the different mobile terminal 200, coupons collected in the mobile terminal 100 may move to the different mobile terminal 200.

The mobile terminal 100 and the different mobile terminal 200 may exchange information by using a short-range communication method including NFC. For example, when the mobile terminal 100 and the different mobile terminal 200 approach, a short-range communication link may be generated by using NFC communication, and then, a next operation may be on standby. When the mobile terminal 100 is brought into contact with the different mobile terminal 200, the controller 180 may determine which of them has been moved to be brought into contact based on sensing results through an acceleration sensor, or the like, of the mobile terminal 100 and/or the different mobile terminal 200. Thus, based on the contact results, the controller 180 may determine a direction in which the coupons are to be transmitted.

As shown in FIG. 13(*a*), when payment is made through tagging using the NFC scheme, the controller 180 may display corresponding information on the display 151. In addition, coupon information as pertinent information may be displayed as mentioned above.

As shown in FIG. 13(*b*), various types of pertinent information including coupons may be displayed in an augmented reality (AR) manner. This means that, for example, the pertinent information may be displayed on an image obtained through the camera 121 of the mobile terminal 100 in an overlapping manner. Displaying the pertinent information through AR, the user can clearly recognize the pertinent information associated with his payment.

As shown in FIG. 13(*c*), the pertinent information associated with the payment may also be displayed on a map. For example, when the mobile terminal 100 is raised so the camera 121 is activated, the pertinent information may be displayed by applying the AR method, and when the mobile terminal 100 is moved to face the ground so the camera 121 is deactivated, the pertinent information may be displayed on the map.

As shown in FIG. 13(d), the controller 180 may guide a route to a particular point at which payment was made. Namely, for example, various types of route information including information regarding from which location the user should move in what direction in order to reach a particular point selected by the user from among points at which payment was made may be displayed on the display 151.

FIGS. 14 and 15 are views illustrating pertinent information of the mobile terminal according to another embodiment.

As shown in FIGS. 14 and 15, when the user makes payment to take particular transportation, such as a subway, or the like, the controller 180 of the mobile terminal according to another embodiment may obtain and display pertinent information.

As shown in FIG. 14(a), the user, while passing by a ticket gate of a subway, may tag the mobile terminal 100 to an NFC reader of the ticket gate. When the user's tagging operation is performed, information for determining a fare of the subway may be exchanged through an NFC link. Also, simultaneously, a current location of the user may be recognized as pertinent information. Namely, it means that the user may be in the subway station as tagged.

The controller 180 may request the user to input a destination. A source location of the user may be specified by the tagging operation as mentioned above. Thus, when the user's destination is obtained, the controller 180 may calculate a route.

As shown in FIG. 14(b), when the destination is received, the controller 180 may calculate a route to reach the destination. Thus, optimized subway operation information may be provided to the user. When a subway train reaches a transfer station or an arrival station, the controller 180 may provide a menu for providing corresponding information to the user.

As shown In FIG. 14(c), when the destination is not received, the controller 180 may provide operation information associated with a current subway station. Namely, it means that information regarding the fact that a subway will pass the subway station where the user is present in three and five minutes may be provided to the user.

As shown in FIG. 14(d), in case in which a destination is received, when the subway train reaches the destination or when it is approaches the destination, the controller 180 may inform the user accordingly.

As shown in FIG. 15(a), when the user arrives at the particular destination, the user may tag the mobile terminal 100 to a reader while passing by a ticket gate of the station.

When the mobile terminal 100 is tagged, the fare of the subway may be paid, and simultaneously, a current location of the user may be obtained through an NFC link formed between the mobile terminal 100 and the reader. The controller 180 may provide menus of a map of the surroundings, search, and a friend search, as pertinent information together with the paid fare. Namely, a map of the surroundings of the current location in which the user is present may be obtained and displayed, information regarding various stores such as coffee branches, and the like, may be obtained and displayed, or pertinent information of a different user registered as a friend may be obtained and displayed, through the wireless communication unit 110 or the like.

As shown in FIG. 15(b), when the friend search menu is selected, controller 180 may obtain a location of the friend through communication with the mobile terminal 100 of the friend. The location of the friend may be obtained from the terminal of the person or from a server communicating with the terminal.

As shown in FIG. 15(c), when the search menu is selected, the controller 180 may provide a menu for searching theaters, or the like, within a certain radius based on the current location of the user of the mobile terminal 100. A search range may be changed according to a user setting.

As shown in FIG. 15(d), when the friend search menu is selected, specific sub-menus may be displayed. For example, it means that a menu for providing which of other users registered as friends is to be searched may be provided.

FIG. 16 is a view illustrating pertinent information of the mobile terminal according to another embodiment.

As shown in FIG. 16, the controller 180 of the mobile terminal 100 may provide information regarding payment information obtained through an established NFC link.

As shown in FIG. 16(a), payment may be made according to a tagging operation with a different NFC terminal. When payment is made, the controller 180 may know an article for which the payment is made. For example, it means that the controller 180 may recognize that payment was made for gasoline in a gas station. When payment was made in a gas station, the controller 180 may receive information regarding a brand of gasoline the user of the mobile terminal 100 prefers.

As shown in FIG. 16(b), the controller 180 may obtain a location of the user substantially in real time. For example, the controller 180 may know that the user is currently moving in a particular direction on a particular expressway through a movement trace of the mobile terminal 100.

Based on the trace of the mobile terminal 100, the controller 180 may obtain and display information regarding gas stations the user may encounter. For example, the controller 180 may display a distance to a particular gas station and/or a price in the gas station.

As shown in FIG. 16(c), when the user of the mobile terminal 100 is located near a particular gas station, the controller 180 may inform the user accordingly.

FIG. 17 is a view illustrating pertinent information of the mobile terminal according to another embodiment.

As shown in FIG. 17, the controller 180 of the mobile terminal according to another embodiment may obtain and display a service schedule of a vehicle.

As shown in FIG. 17(a), when the user gets on a vehicle and performs tagging on a payment terminal, the controller 180 may obtain and display information regarding a service schedule of the vehicle. For example, the controller 180 may obtain and display a current location, a next destination, a final destination, and pertinent time information.

As shown in FIG. 17(b), before the vehicle arrives at a particular point, the controller 180 may inform the user accordingly.

As shown in FIG. 17(c), the controller 180 may inform the user about a time at which the user should start from a current location in order to take a shuttle bus. For example, when the shuttle bus starts at 2:35, the controller 180 may inform the user when the user should start in consideration of a time taken for the user to reach the place at which the user is to get on the shuttle bus.

FIG. 18 is a view illustrating pertinent information of the mobile terminal according to another embodiment.

As shown in FIG. 18, when the user takes a taxi and performs tagging, the controller of the mobile terminal according to another embodiment may display related information.

As shown in FIG. 18(a), when the user takes a taxi and tags the mobile terminal 100 to a reader, information regarding an estimated required time, vehicle information, driver information, and the like. In addition, the corresponding information may be transmitted to an acquaintance of the user of the mobile terminal 100. Thus, a possibility in which the user is exposed to a crime in using a taxi can be reduced.

As shown in FIG. 18(b), when the taxi arrives at a destination and a taxi fare is paid by the mobile terminal 100, the controller 180 may display payment information. In addition, the controller 180 may display information regarding a route through which the taxi has reached the destination.

As shown in FIG. 18(c), when there is a service associated with payment of the taxi fare, the controller 180 may obtain and display the corresponding information.

Figure 19:
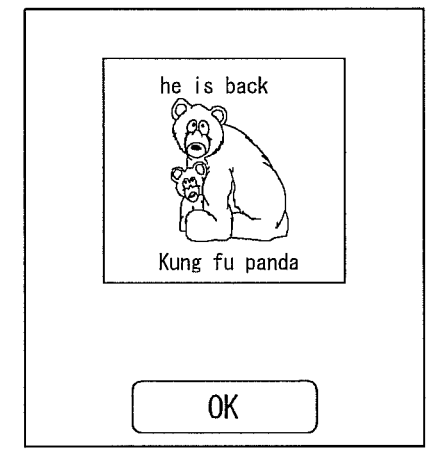
FIG. 19 is a view illustrating pertinent information of the mobile terminal according to another embodiment.

FIG. 19 is a view illustrating pertinent information of the mobile terminal according to another embodiment.

As shown in FIG. 19, the controller 180 of the mobile terminal according to another embodiment may display information regarding payment of a movie ticket.

As shown in FIG. 19(a), the user of the mobile terminal 100 may pay the cost of watching movie through a tagging operation. The controller 180 may obtain information regarding a time at which the paid movie is shown. The controller 180 may activate a movie mode based on the obtained time information. The movie mode may be a mute mode or a vibration mode.

As shown in FIG. 19(b), the controller 180 of the mobile terminal may display information regarding the paid movie.

As shown in FIG. 19(c), when a time at which the movie is shown arrives, the controller 180 may automatically activate the movie mode, and when the showing of the movie ends, the controller may automatically deactivate the movie mode.

As shown in FIG. 19(d), when the show time of the movie is terminated, the controller 180 may provide an image allowing for inputting of a score, or the like, related to the movie, along with the deactivation of the movie mode.

Figure 20:
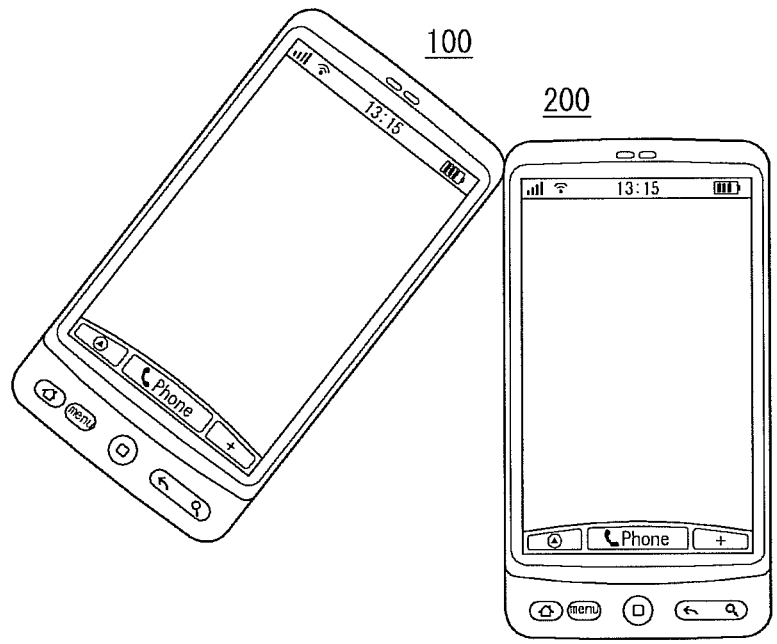

FIGS. 20 and 21 are views illustrating pertinent information of the mobile terminal according to another embodiment.

As shown in FIGS. 20 and 21, the controller 180 of the mobile terminal 100 according to another embodiment may allow the particular mobile terminal 100 to transfer money gifts, or the like, at a time.

As shown in FIG. 20(a), an operation of bringing the different terminal 200 into contact with the mobile terminal 100 may be performed. When tagging of the different terminal 200 to the mobile terminal 100 is sensed, a certain amount of money may be transferred from an account of the user of the different terminal 200 to an account of the user of the mobile terminal 100. In this case, the tagging operation may include an operation of physically bringing the different terminal 200 and the mobile terminal 100 into contact with each other and/or making the different terminal 200 and the mobile terminal 100 approach within a certain distance.

As shown in FIG. 20(b), the controller 180 of the mobile terminal 100 may receive a setting in which a person to receive money is designated and a pre-set amount is transferred.

As shown in FIG. 20(c), the controller 180 of the mobile terminal 100 may display a total amount of money.

As shown in FIG. 21(a), the user of the mobile terminal 100 may tag the mobile terminal 100 to an NFC tag 200 installed in a particular place. For example, the user may tag the mobile terminal 100 to the NFC tag 200 installed in a wedding hall to which the gift money is to be transferred.

As shown in FIG. 21(b), when the mobile terminal 100 is tagged, the controller 180 may display the fact that the gift money has been transferred on the display 151.

As shown in FIG. 21(c), when the mobile terminal 100 is tagged to the NFC tag 200, a food ticket according to the transfer of the gift money may be issued.

Figure 22:
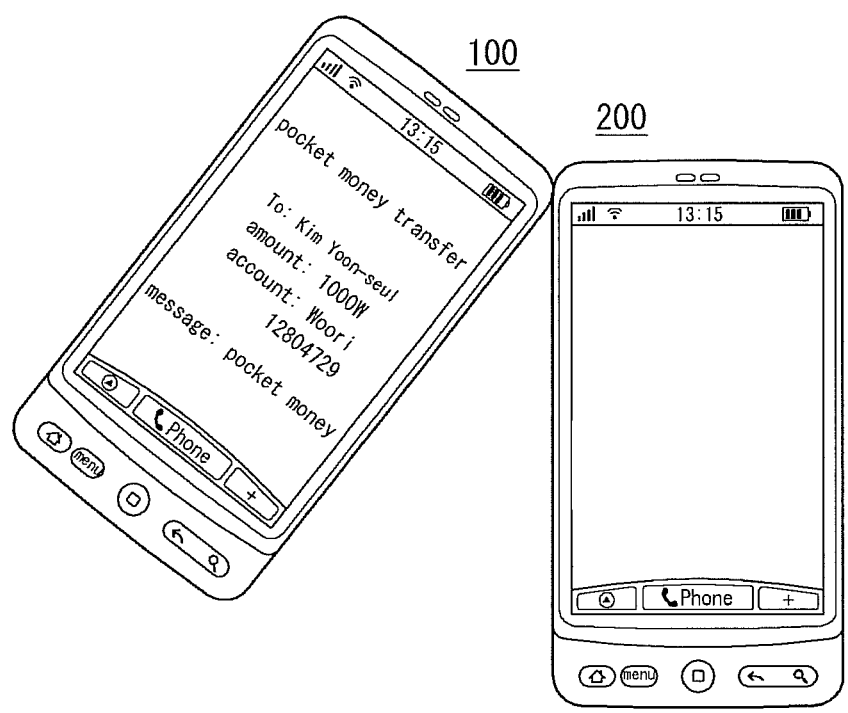
FIG. 22 is a view illustrating pertinent information of the mobile terminal according to another embodiment.

FIG. 22 is a view illustrating pertinent information of the mobile terminal according to another embodiment.

As shown in FIG. 22, the controller 180 of the mobile terminal 100 according to another embodiment may transfer a pre-set amount of money according to a tagging operation of bringing the mobile terminal 100 into contact with the different terminal 200. Also, the controller 180 of the mobile terminal 100 may also transfer a related message together with the transferred amount of money.

FIG. 23 is a view illustrating pertinent information of the mobile terminal according to another embodiment.

As shown in FIG. 23, the controller 180 of the mobile terminal 100 according to another embodiment may perform an operation of guiding exhibition in a particular place such as an art museum, or the like.

As shown in FIG. 23(a), the user may make payment for an admission to an art museum, or the like, through an NFC tagging operation. When the mobile terminal 100 is tagged, the controller 180 may perform guidance with respect to the art museum, or the like, along with the payment information.

As shown in FIG. 23(b), when the mobile terminal 100 is tagged to a reader positioned near a particular art object, the controller 180 may display information regarding the art object.

As shown in FIG. 23(c), when a tagging operation for an admittance to the art museum, or the like, is performed, the controller 180 may automatically activate an art museum mode. For example, it means that a setting such as muting a sound, or the like, may be automatically performed.

FIG. 24 is a view illustrating pertinent information of the mobile terminal according to another embodiment.

As shown in FIG. 24, the controller 180 of the mobile terminal 100 according to another embodiment may check attendance of students, and so on.

As shown in FIG. 24(a), a reader may be positioned in the entrance, or the like, of a class room, and when the user of the mobile terminal 100 tags the mobile terminal 100 to the reader, the controller 180 may obtain and display pertinent information.

As shown in FIG. 24(b), the controller 180 may display the status of students in attendance on the display 151.

As shown in FIG. 24(c), the controller 180 may display a link from which data associated with the class can be downloaded.

As shown in FIG. 24(d), the controller 180 may display a time table of other classes associated with the corresponding class.

FIG. 25 is a view illustrating pertinent information of the mobile terminal according to another embodiment.

As shown in FIG. 25, when a check card is charged according to an NFC tagging operation, the controller 180 of the mobile terminal 100 according to another embodiment may display corresponding information.

As shown in FIG. 25(a), when payment is made, the controller 180 may display payment-related information on the display 151. In addition, the controller 180 may display information regarding the number of times of using the check card, or the like. In addition, the controller 180 may further display a menu for charging the balance of the check card.

As shown in FIG. 25(b), when the menu for charging the balance of the check card, the controller 180 may enter a state in which the check card can be charged.

Before entering the state for charging the check card, the controller 180 may allow for inputting of a password to selectively permit the entry into a relevant menu. Namely, it means that only a user who inputs a password is allowed to enter the state for charging the check card.

As shown in FIGS. 25(c) and 25(d), when the user enters the state in which the check card can be charged and determines an amount to be remitted, a selected amount of money may be remitted to an account of a check card from a particular account.

FIG. 26 is a view illustrating pertinent information of the mobile terminal according to another embodiment.

As shown in FIG. 26, the controller 180 of the mobile terminal 100 according to another embodiment may perform a function of selecting a seat in a place such as a library, or the like.

As shown in FIG. 26(a), the user of the mobile terminal 100 may tag the mobile terminal 100 to a reader installed in the entrance of a library, or the like. When the mobile terminal 100 is tagged, the controller 180 may obtain and display information regarding the number of current empty seats, information regarding the number of books which is currently rented, information regarding the number of currently overdue books, and the like.

As shown in FIG. 26(b), the controller 180 may display information regarding empty seats in a library, as pertinent information. In addition, the controller 180 may display which of seats has been allocated according to the user's tagging operation.

As shown in FIGS. 26(c) and 26(d), the controller 180 may display information regarding the number of books which is currently rented and information regarding the number of overdue books.

Figure 27:
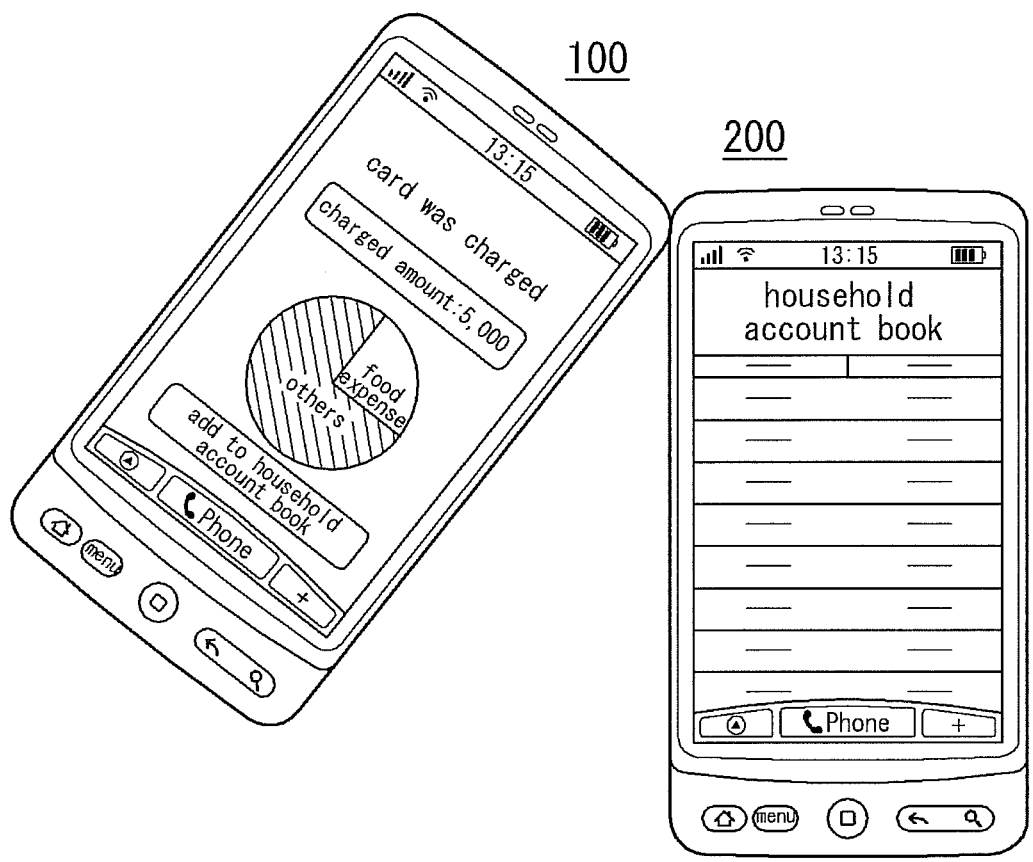
FIG. 27 is a view illustrating pertinent information of the mobile terminal according to another embodiment.

FIG. 27 is a view illustrating pertinent information of a mobile terminal according to another embodiment.

As shown in FIG. 27, the controller 180 of the mobile terminal 100 according to another embodiment may collect card charge information as obtained and create a household account book.

The different terminal 200 may be brought into contact with the mobile terminal 100 to perform a tagging operation. In this case, the tagging operation may include an operation of physically bringing the different terminal 200 and the mobile terminal 100 into contact with each other and/or making the different terminal 200 and the mobile terminal 100 approach within a certain distance.

When the different terminal 200 is tagged to the mobile terminal 100, the mobile terminal 100 may obtain charge information. The controller 180 of the mobile terminal 100 may create a household account book by arranging the obtained payment information.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a display;
   a NFC communication module to establish a NFC communication link when the mobile terminal is tagged to at least one first terminal; and
   a controller configured to:
      establish the NFC communication link with the at least one first terminal,
      obtain payment information for a payment via the NFC communication link,
      obtain handover information via the NFC communication link,
      establish a wireless internet link that is different from the NFC communication link,
      obtain pertinent information via the wireless internet link, and
      display the payment information and the pertinent information on the display.

2. The mobile terminal of claim 1, wherein the pertinent information is one of information regarding points collected by the payment, information regarding a discount based on the payment, information regarding an article associated with the paid article, or information regarding a service associated with the paid service.

3. The mobile terminal of claim 1, wherein a service is a traffic service, and the pertinent information is one of information regarding a location in which the traffic service is provided, information regarding a time at which the traffic service is provided, or information regarding a person who provides the traffic service.

4. The mobile, terminal of claim 1, wherein the controller transmits the pertinent information to a second terminal when the mobile terminal is tagged to the second terminal.

5. The mobile terminal of claim 1, wherein the controller changes an operation mode of the mobile terminal based on the pertinent information.

6. The mobile terminal of claim 5, wherein the pertinent information includes time information, and the controller changes the operation mode based on the time information.

7. The mobile terminal of claim 1, wherein the pertinent information includes time information, and the controller controls the display to display an arrival time based on the time information.

8. The mobile terminal of claim 1, further comprising a wireless Internet module and a mobile communication module, wherein the controller obtains the pertinent information through the wireless Internet module or the mobile communication module.

9. A method of controlling a mobile terminal, the method comprising:
establishing a NFC communication link with at least one first terminal, wherein the NFC communication link is established when the mobile terminal is tagged to the first terminal;
obtaining payment information for a payment via the NFC communication link;
obtaining handover information via the NFC communication link;
establishing a wireless internet link that is different from the NFC communication link;
obtaining pertinent information via the wireless internet link; and
displaying the payment information and the pertinent information on the display.

10. The method of claim 9, wherein the pertinent information is one of information regarding points collected by the payment, information regarding a discount issued according to the payment, information regarding an article associated with the paid article, or information regarding a service associated with the paid service.

11. The method of claim 9, further comprising:
transmitting the pertinent information to a second terminal when the mobile terminal is tagged to the second terminal.

12. The method of claim 9, further comprising:
changing an operation mode of the mobile terminal based on the pertinent information.

13. A method of a mobile terminal, the method comprising:
tagging the mobile terminal to a first terminal when the first terminal is within a prescribed distance from the mobile terminal;
receiving payment information for a payment through a NFC communication link formed between the mobile terminal and the first terminal based on the tagging;
receiving handover information via the NFC communication link;
establishing a wireless internet link that different from the NFC communication link;
receiving pertinent information associated with the payment information via the wireless internet link between the mobile terminal and an external server; and
executing a function based on the received pertinent information.

14. The method of claim 13, wherein the pertinent information is one of information regarding points collected by the payment, information regarding a discount issued according to the payment, information regarding an article associated with the paid article, or information regarding a service associated with the paid service.

15. The method of claim 13, further comprising:
transmitting the pertinent information to a second terminal when the mobile terminal is tagged to the second terminal.

16. The method of claim 13, wherein executing the function includes changing an operation mode of the mobile terminal based on the pertinent information.

17. The method of claim 13, wherein executing the function includes displaying the pertinent information on the mobile terminal.

* * * * *